Patented June 2, 1953

2,640,831

UNITED STATES PATENT OFFICE 2,640,831

REACTION OF CARBON MONOXIDE AND HYDRAZINE

Gerard Dunstan Buckley and Neil Hunter Ray, Northwich, England, assignors to Imperial Chemical Industries Limited, a corporation of Great Britain No Drawing. Application February 7, 1949, Serial No. 75,084. In Great Britain February 18, 1948

7 Claims. (Cl. 260—308)

This invention relates to the manufacture of organic nitrogen compounds by a process involving the use of carbon monoxide at high pressures and elevated temperatures.

It is known that carbon monoxide can be used to reduce nitrocompounds and carboxylic acids at a high temperature in presence of a metal catalyst, but these catalysts are not always satisfactory and no other compounds have been reduced. A high pressure reaction in which carbon monoxide has been used successfully is its interpolymerisation at high pressures with polymerisable organic compounds having ethylenic unsaturation.

According to the present invention, we manufacture organic nitrogen compounds by a process which comprises reacting hydrazine or its derivatives with carbon monoxide at high pressures and superatmospheric temperatures.

The reaction can yield a number of products depending on how far it proceeds, and it can be stopped at any chosen stage. Thus, in the first stage, hydrazine can be converted by reaction with carbon monoxide into semicarbazide, with liberation of ammonia. Beyond this stage, semicarbazide can be converted into cyclic compounds; and according to the process described in our co-pending application, Serial No. 75,083, filed February 7, 1949, now abandoned, these cyclic compounds are among the substances which can be reduced by reaction with carbon monoxide at a high pressure and temperature. Thus we can convert hydrazine into certain cyclic compounds by reacting it with carbon monoxide. These cyclic compounds are generally triazole derivatives, one cyclic reduction product being 4-amino-1,2,4-triazol-3-one, which has a

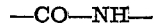

group in a heterocyclic ring, and a final reduction product being 4-amino-triazole.

From the foregoing description, it will be clear that we can start not only with hydrazine but also with a group of compounds derived from it and having essentially the same —NH.NH— structure. These clearly include: hydrazine hydrate; semicarbazide, $NH_2.NH.CO.NH_2$; carbohydrazide, $NH_2.NH.CO.NH.NH_2$; hydrazine dicarbonamide, $NH_2.CO.NH.NH.CO.NH_2$; and similar substances.

The conditions required are a high carbon monoxide pressure exceeding 100 atmospheres and a superatmospheric temperature exceeding 30° C. The pressure required generally exceeds 500 atmospheres if the reaction is to proceed to a substantial extent within a few hours, and for complete reaction in the first stage yielding semicarbazide or 4-aminourazole we prefer to use a pressure of 700–1000 atmospheres. We obtain one or other of these products by choosing a suitable temperature. Suitable temperatures range from 30° C. up to 80° C. for the production of semicarbazide, or from 100° to 200° C. for making a 4-aminourazole. For the reduction steps, pressures exceeding 1000 atmospheres and temperatures above 150° C. are required, and we prefer to use pressures of 2000–5000 atmospheres and temperatures of 150°–200° C. because these give yields above 80% within a few hours. The reaction can be carried out either anhydrous or in presence of water or other liquid media, and water is the most convenient medium in which to introduce the hydrazine. The process can be carried out continuously.

The products are useful inter alia as intermediates in the manufacture of dyestuffs, pharmaceutical, and other products.

The invention is illustrated but not restricted by the following examples in which all parts are by weight.

*Example 1*

100 parts of a 90% aqueous solution of hydrazine hydrate were put into a high pressure reaction vessel fitted with a stirrer. Carbon monoxide was pumped in up to a pressure of 300 atmospheres. The vessel was then heated to 150° C. and more carbon monoxide added until the total pressure was 1000 atmospheres. This temperature and pressure were maintained for 20 hours, when the vessel was cooled and the pressure released. The contents of the vessel were evaporated to dryness under reduced pressure and the residue was extracted with alcohol. The alcoholic extract was evaporated until, on cooling, crystallisation occurred. There were obtained 18 parts of 4-amino-1,2,4-triazol-3-one, of melting point 179°–180° C.

*Example 2*

100 parts of a 90% aqueous solution of hydrazine hydrate were treated with carbon monoxide in the manner described in Example 1, at 150° C. and 3000 atmospheres for 24 hours. The contents of the vessel were filtered and the filtrate was evaporated to dryness under reduced pressure. The residue was dried by azeotropic distillation with chloroform (in which the product is insoluble). The residue was recovered from the chloroform suspension by filtration, and in this way 20 parts of 4-amino-1,2,4-triazole were obtained, of melting point 82°–83° C.

*Example 3*

10 parts of semicarbazide and 10 parts of a 90% aqueous solution of hydrazine hydrate were treated as described in Example 1 with carbon monoxide at 150° C. and 1000 atmospheres, for 15 hours. The product was isolated as described in Example 1 and there were obtained 12 parts of 4-amino-1,2,4-triazol-3-one.

*Example 4*

80 parts of 90% hydrazine hydrate were treated with carbon monoxide at 50° C. and 1000 atmospheres for 20 hours. The product was isolated by evaporation of the contents of the vessel under reduced pressure. It consisted of 24 parts of semicarbazide, of melting point 96° C.

*Example 5*

10 parts of hydrazine dicarbonamide and 10 parts of a 90% aqueous solution of hydrazine hydrate were reacted with carbon monoxide as described in Example 1, at 180° C. and 3000 atmospheres, for 20 hours. The product was isolated as described in Example 2, and in this way 12 parts of 4-amino-1,2,4-triazole were obtained.

Having now particularly described and ascertained the nature of our said invention and in what manner the same is to be performed, we declare that what we claim is:

1. The process for the formation of organic nitrogen compounds containing the group >N—C—NH— which comprises reacting hydrazine with carbon monoxide at a pressure between 100 and 5000 atmospheres and a temperature between 30° and 200° C.

2. Process as claimed in claim 1 in which a triazolone is prepared at a pressure of 500–1500 atmospheres and a temperature of 100°–200° C.

3. Process as claimed in claim 1 in which a triazole is prepared at a pressure of 2000–5000 atmospheres and a temperature of 150°–200° C.

4. A process for the manufacture of semicarbazide which comprises reacting hydrazine with carbon monoxide at a temperature of 30–80° C. and a pressure of 700–1500 atmospheres.

5. The process for the formation of organic nitrogen compounds containing the group

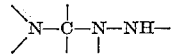

which comprises reacting hydrazine with carbon monoxide at a temperature from about 100° C. to about 200° C. and at a pressure in excess of about 100 atmospheres to about 1000 atmospheres.

6. The process for the formation of organic nitrogen compounds which comprises reacting hydrazine with carbon monoxide at an elevated temperature exceeding 30° C. and super-atmospheric pressure exceeding 100 atmospheres.

7. A process for the formation of semicarbazide which comprises reacting hydrazine with carbon monoxide at a temperature of about 50° C. and a pressure of about 1000 atmospheres.

GERARD DUNSTAN BUCKLEY.
NEIL HUNTER RAY.

References Cited in the file of this patent

UNITED STATES PATENTS

| Number | Name | Date |
|---|---|---|
| 2,589,290 | Sampson | Mar. 18, 1952 |

OTHER REFERENCES

Marecek: "Chemicky Obzor," vol. 23, Dec. 30, 1948, pp. 217 to 221.